(12) United States Patent
Du

(10) Patent No.: US 10,710,923 B2
(45) Date of Patent: Jul. 14, 2020

(54) WHEEL CUTTER FOR CUTTING A FLEXIBLE GLASS SUBSTRATE AND CUTTING METHOD THEREOF

(71) Applicant: WUHAN CHINA STAR OPTOELECTRONICS SEMICONDUCTOR DISPLAY TECHNOLOGY CO., LTD., Wuhan, Hubei (CN)

(72) Inventor: Xiao Du, Hubei (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 138 days.

(21) Appl. No.: 15/740,005

(22) PCT Filed: Dec. 5, 2017

(86) PCT No.: PCT/CN2017/114523
§ 371 (c)(1),
(2) Date: Dec. 27, 2017

(87) PCT Pub. No.: WO2019/080264
PCT Pub. Date: May 2, 2019

(65) Prior Publication Data
US 2019/0127263 A1 May 2, 2019

(30) Foreign Application Priority Data
Oct. 26, 2017 (CN) .......................... 2017 1 1017382

(51) Int. Cl.
*C03B 33/10* (2006.01)
*C03B 33/02* (2006.01)

(52) U.S. Cl.
CPC ............ *C03B 33/107* (2013.01); *C03B 33/02* (2013.01)

(58) Field of Classification Search
CPC ...... C03B 33/107; B27B 33/02; Y10T 83/935
See application file for complete search history.

(56) References Cited

U.S. PATENT DOCUMENTS

| 4,331,056 A * | 5/1982 | Hombach | ............ B23D 47/005 83/665 |
| 6,688,206 B1 * | 2/2004 | Mummenhoff | ...... B23D 59/025 83/676 |
| 7,735,531 B2 * | 6/2010 | Gilbert | ................... B27G 13/06 144/230 |
| 2002/0033087 A1 * | 3/2002 | Soyama | ................. B28D 1/225 83/886 |

(Continued)

*Primary Examiner* — Andrea L Wellington
*Assistant Examiner* — Fernando A Ayala
(74) *Attorney, Agent, or Firm* — Mark M. Friedman

(57) ABSTRACT

A wheel cutter for cutting a flexible glass substrate and a cutting method thereof are provided and the wheel cutter has a first disk surface and a second disk surface; a circumferential cutting edge formed by the first disk surface and the second disk surface extending outwardly and intersecting each other; a central shaft hole; and a hollow region connected to the central shaft hole; a plurality of recesses distributed on the circumferential cutting edge and communicating with the hollow region; wherein the hollow region is a double cone structure configured to allow cleaning an inside of the wheel cutter.

16 Claims, 6 Drawing Sheets

(56) References Cited

U.S. PATENT DOCUMENTS

| | | | | |
|---|---|---|---|---|
| 2002/0038594 | A1* | 4/2002 | Maekawa | C03B 33/107 83/886 |
| 2005/0245051 | A1* | 11/2005 | Maekawa | B28D 5/0011 438/462 |
| 2007/0056171 | A1* | 3/2007 | Taryoto | C03B 33/107 30/350 |
| 2008/0131221 | A1* | 6/2008 | Yanagida | B23B 51/06 408/59 |
| 2009/0067942 | A1* | 3/2009 | Tanaka | B23B 51/02 408/224 |
| 2011/0174132 | A1* | 7/2011 | Kwon | B26D 1/00 83/875 |
| 2012/0012632 | A1* | 1/2012 | Tominaga | B28D 1/24 225/2 |
| 2013/0008293 | A1* | 1/2013 | Friedrichs | B23D 59/02 83/169 |
| 2013/0098650 | A1* | 4/2013 | Fischer | B25D 9/10 173/209 |
| 2013/0313301 | A1* | 11/2013 | Brown | C03B 33/023 225/2 |
| 2015/0101472 | A1* | 4/2015 | Baratta | B23D 59/025 83/835 |
| 2016/0368810 | A1* | 12/2016 | Wang | C03B 33/107 |

\* cited by examiner

WHEEL CUTTER FOR CUTTING A FLEXIBLE GLASS SUBSTRATE AND CUTTING METHOD THEREOF

FIELD OF THE INVENTION

The present invention relates to the fields of display panel manufacture, especially to a wheel cutter for cutting a flexible glass substrate and a cutting method thereof.

BACKGROUND OF INVENTION

Flexible displays are an important direction in displaying technologies fields. Different from conventional rigid screen displays, exclusive flexible glass substrate and flexible package technology of flexible display technologies provide a flexible display device with unique characteristics of super thinness, extra lightness, deformability, and carrying ease. However, during manufacturing, because of the unique characteristics of the flexible glass substrate, processing a device on a surface of a single flexible glass substrate causes issues of deformation, crumple, and displacement of the substrate. Therefore, such display apparatuses, in a conventional manufacturing process, generally use a glass substrate as a rigid supporting substrate. A polymer film, serving as a flexible substrate, is coated on the rigid substrate. A flexible display screen is made by sequentially adopting manufacturing processes. Finally, a completely manufactured flexible glass substrate is separated from a glass. Conventional cutting technologies applied to flexible display device cutting processes are divided in two main categories including wheel cutter cutting and laser cutting.

Wheel cutter cutting is a brittle material processing method commonly used in industrial manufacturing, and is extensively used in production of LCD rigid screen display devices. When cutting a substrate covered with flexible material, a wheel cutter needs to completely cut the flexible material layer first. After a cutting portion of the wheel cutter contacts and presses in the rigid glass substrate, the entire glass substrate can be cut. However, compared to brittle material such as glass, the flexible material is a polymer organic material, and scraps of the flexible material have viscosity. When the wheel cutter with teeth cuts across the flexible layer, the flexible material scraps generated thereby have viscosity and are adhered on portions among teeth and on the teeth of the wheel cutter. Long-term accumulation of the flexible material scraps can cause decreased cutting performance of the wheel cutter. Such scrap accumulation issue also brings instability for the wheel cutter to cut the flexible glass substrate.

Laser cutting belongs to thermal cutting methods, and the principle thereof is employing focused laser beam of high power density to irradiate the material to be cut such that the material is instantly melted, vaporized or burned and etched to form a hollow. With the movement of the laser beam relative to the material, hollows are formed continuously to form a cutting slit with a very narrow width such that cutting material is achieved. A primary wavelength absorbed by the flexible material is different from that absorbed by the glass substrate, and a maximum absorbed wavelength of the flexible material is mainly in an ultraviolet (UV) light area while a maximum absorbed wavelength of the glass substrate is mainly in an infrared light area. Therefore, in the current stage a cutting process using laser to cut flexible glass substrates needs to dispose two different laser generating devices. Because laser cutting has shortages such as expensive apparatuses, complicated processes and maintenance, heat affected zones, and ash remaining on ablated flexible layer, there is still a lot of work needs to be done in laser cutting for mass production of flexible panels.

As described above, the conventional wheel cutter for cutting a flexible glass substrate has the issue of flexible material scraps easily stuck among teeth of the wheel cutter to cause reduced cutting performance such that instability is brought to the wheel cutter cutting the flexible glass substrate. Because laser cutting has disadvantages such as using expensive apparatuses, complicated processes and maintenance, heat affected zones, and ash remaining on ablated flexible layer, there is still a lot of work needs to be done in laser cutting for mass production of flexible panels.

SUMMARY OF INVENTION

The present invention provides a wheel cutter for cutting a flexible glass substrate that effectively prevents flexible material scraps from affecting cutting performance of the wheel cutter such that stability of a cutting process in a longer mileage is ensured.

To solve the above issue, the present invention provides a technical solution as follows.

The present invention provides a wheel cutter for cutting a flexible glass substrate, comprising:

a first disk surface;

a second disk surface disposed opposite to the first disk surface;

a circumferential cutting edge formed by the first disk surface and the second disk surface extending outwardly and intersecting each other;

a central shaft hole defined through central portions of the first disk surface and the second disk surface; and a hollow region formed by the first disk surface engaged with the second disk surface, and the hollow region connected to the central shaft hole and configured to temporarily store flexible polymer scraps, wherein the hollow region is centrally symmetric;

a plurality of holes distributed on the circumferential cutting edge, communicating with the hollow region, and configured to bring and store the flexible polymer scraps in the hollow region;

wherein the hollow region is a double cone structure configured to allow an insertion of a cleaning device thereinto to clean an inside of the wheel cutter.

According to a preferred embodiment of the present invention, an opening length of the holes is within a range of the hollow region.

According to a preferred embodiment of the present invention, the hole is a symmetrical straight arm V-shaped structure, and a bottom opening thereof is arced.

According to a preferred embodiment of the present invention, an outer diameter of the wheel cutter is 1.5 mm-4 mm, a thickness of the wheel cutter is 0.5 mm-1.3 mm, and a diameter of the central shaft hole is 0.7 mm-1.5 mm.

According to a preferred embodiment of the present invention, two opposite sides of the hollow region in the wheel cutter intersect the central shaft hole to form two intersected portions and a width of each intersect portion is 0.3 mm-1 mm.

According to a preferred embodiment of the present invention, a depth of each of the recesses is 1 um-15 um, a number of the recesses is 10-300, and a radius of arc of the bottom of each of the recesses is 0.2 um-1 um.

According to a preferred embodiment of the present invention, the recesses are evenly distributed on the circumferential cutting edge, and a width of the circumferential cutting edge between adjacent two of the recesses is larger than or equal to a width of the recess.

According to a preferred embodiment of the present invention, an angle of the circumferential cutting edge is an obtuse angle, and a range of angle thereof is 95°-135°.

The present invention also provides a flexible glass substrate cutting method using the above wheel cutter, the flexible glass substrate cutting method steps as follows:

step S101, selecting a wheel cutter according to characteristics of the flexible glass substrate;

step S102, mounting the selected wheel cutter to a wheel cutter cutting machine, testing accuracy and/or smoothness of cutting by a test piece, and repeating the current step for 8 to 15 times;

step S103, determining a cutting performance of the wheel cutter as good and cutting if the cutting test shows that an amount of cutting marks is less than 200 um, cutting lines of the flexible layer are not apparently damaged, and split pieces are not broken; and step S104, after the flexible glass substrate is cut for 200 m-500 m, detaching the wheel cutter, inserting a cleaning fixture into the wheel cutter, and spraying alcohol out through the cleaning fixture to wash the wheel cutter such that residual flexible material scraps inside are cleaned.

The present invention also provides a wheel cutter for cutting a flexible glass substrate, comprising:

a first disk surface;

a second disk surface disposed opposite to the first disk surface;

a circumferential cutting edge formed by the first disk surface and the second disk surface extending outwardly and intersecting each other;

a central shaft hole defined through central portions of the first disk surface and the second disk surface; and a hollow region formed by the first disk surface engaged with the second disk surface, the hollow region connected to the central shaft hole and configured to temporarily store flexible polymer scraps;

a plurality of recesses distributed on the circumferential cutting edge, communicating with the hollow region, and configured to bring and store the flexible polymer scraps in the hollow region;

wherein the hollow region is a double cone structure configured to allow an insertion of a cleaning device thereinto to clean an inside of the wheel cutter.

According to a preferred embodiment of the present invention, an opening length of the recess is within a range of the hollow region.

According to a preferred embodiment of the present invention, the hole is a symmetrical straight arm V-shaped structure, and a bottom opening thereof is arced.

According to a preferred embodiment of the present invention, an outer diameter of the wheel cutter is 1.5 mm-4 mm, a thickness of the wheel cutter is 0.5 mm-1.3 mm, and a diameter of the central shaft hole is 0.7 mm-1.5 mm.

According to a preferred embodiment of the present invention, two opposite sides of the hollow region in the wheel cutter intersect the central shaft hole to form two intersected portions and a width of each intersect portion is 0.3 mm-1 mm.

According to a preferred embodiment of the present invention, a depth of each of the holes is 1 um-15 um, a number of the recesses is 10-300, and a radius of the arc of the bottom of each of the recesses is 0.2 um-1 um.

According to a preferred embodiment of the present invention, the holes are evenly distributed on the circumferential cutting edge, and a width of the circumferential cutting edge between adjacent two of the holes is larger than or equal to a width of the hole.

According to a preferred embodiment of the present invention, an angle of the circumferential cutting edge is an obtuse angle, and a range of angle thereof is 95°-135°.

Advantageous effects of the present invention are as follows. In comparison to a conventional wheel cutter for cutting a flexible glass substrate, the wheel cutter for cutting a flexible glass substrate provided by the present invention is able to effectively cut flexible glass substrates, and its flexible material scrap temporary storage areas can effectively prevent flexible material scraps from affecting cutting performance of the wheel cutter such that stability of a cutting process in a longer mileage is ensured. By selecting wheel cutters with different cutting-edge bevel angles and teeth depths, cutting requirements for different thicknesses of flexible layers and glass substrates can be satisfied. After the flexible layer is cut by the wheel cutter, because effect of the wheel cutter to the flexible layer in a lateral extent is larger than effect of the wheel cutter to the glass substrate in the lateral extent, the rigid substrate is exposed for 30 um, and therefore excessive abrasion of the flexible layer is prevented in a later edge abrading process. By the designed cleaning device, residual flexible material scraps in the wheel cutter may be effectively removed to ensure stability and yield rate of the process.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
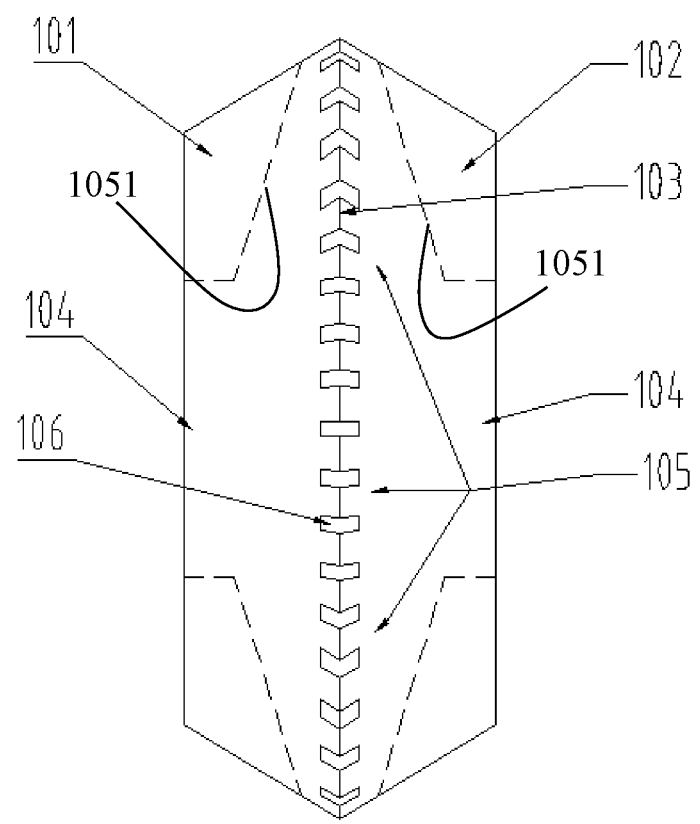
FIG. 1 is a front view of a wheel cutter provided by an embodiment in accordance with the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface" and etc., only refer to the directions of the appended figures. Therefore, the terminologies of direction are used for explanation and comprehension of the present invention, instead of limiting the present invention. In the figures, units with similar structures are marked with the same reference numerals.

The present invention is aimed at a technical issue of a conventional wheel cutter for cutting a flexible glass substrate, and solves the technical issue that in a conventional wheel cutter for cutting a flexible glass substrate, flexible material scraps are easily stuck among teeth of the wheel cutter to cause reduced cutting performance such that instability is brought to the wheel cutter cutting the flexible glass substrate. Embodiments of the present invention are able to solve the above defect.

With reference to FIG. 1 that is a front view of a wheel cutter provided by the present embodiment, the wheel cutter includes: a first disk surface 101 and a second disk surface 102 disposed opposite to the first disk surface 101. The first disk surface 101 and the second disk surface 102 are engaged with each other, extend outward and intersect each other to form a circumferential cutting edge 103; a central shaft hole 104 defined through central portions of the first disk surface 101 and the second disk surface 102; and a hollow region 105 formed by the first disk surface 101 engaged with the second disk surface 102, the hollow region 105 connected to the central shaft hole 104 and configured to temporarily store flexible polymer scraps; a plurality of holes 106, the holes 106 distributed on the circumferential cutting edge 103, communicating with the hollow region 105, and configured to bring and store the flexible polymer scraps in the hollow region 105, a recessed wall of the hole 106 is a symmetrical straight arm V-shaped structure, and a bottom opening thereof is arced; a thickness of the wheel cutter is 0.5 mm-1.3 mm, two opposite sides of the hollow region 105 in the wheel cutter intersect the central shaft hole 104 to form two intersected portions and a width of each intersect portion is 0.3 mm-1 mm, the hollow region 105 has a tapered channel 1051 defined in each of the central portions of the first disk surface 101 and the second disk surface 102 and configured to allow an insertion of a cleaning device thereinto to clean an inside of the wheel cutter. The tapered channels in the central portions are arranged symmetrically.

Figure 2:
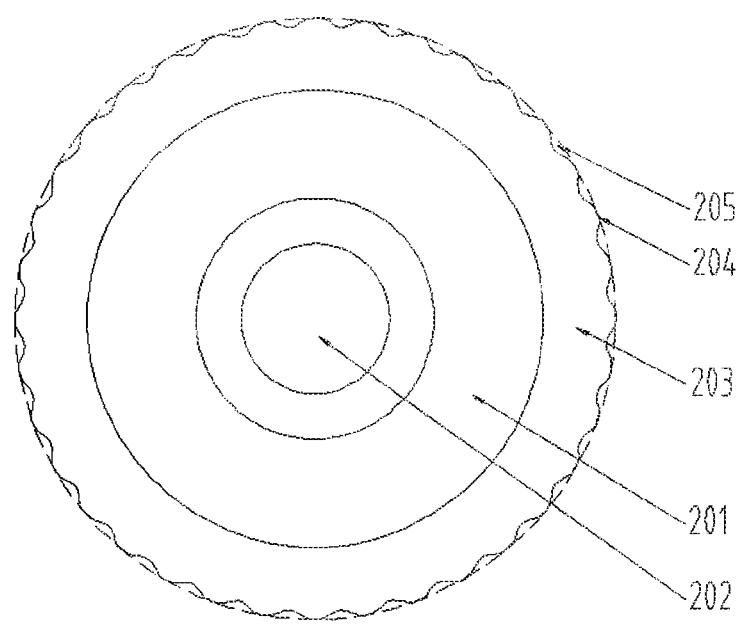
FIG. 2 is a side view of the wheel cutter provided by the embodiment in accordance with the present invention.

With reference to FIG. 2 that is a side view of the wheel cutter provided by the present embodiment, the wheel cutter includes: a first disk surface 201 and a second disk surface dispose opposite to the first disk surface 201. A central shaft hole 202 is in centers of the first disk surface 201 and the second disk surface. Extension portions 203 of the first disk surface 201 and the second disk surface intersect each other to form a circumferential cutting edge 204. A plurality of holes 205 are distributed evenly on the circumferential cutting edge 204. A bottom opening of the hole 205 is arced. The holes 205 communicate with the hollow region in the wheel cutter. An outer diameter of the wheel cutter is 1.5-4.0 mm, a diameter of the central shaft hole 202 is 0.7-1.5 mm, a depth of each of the holes 205 is 1 um-15 um, a number of the holes is 10-300, a radius of the arc of the bottom of each of the holes 205 is 0.2-1 um.

Figure 3:
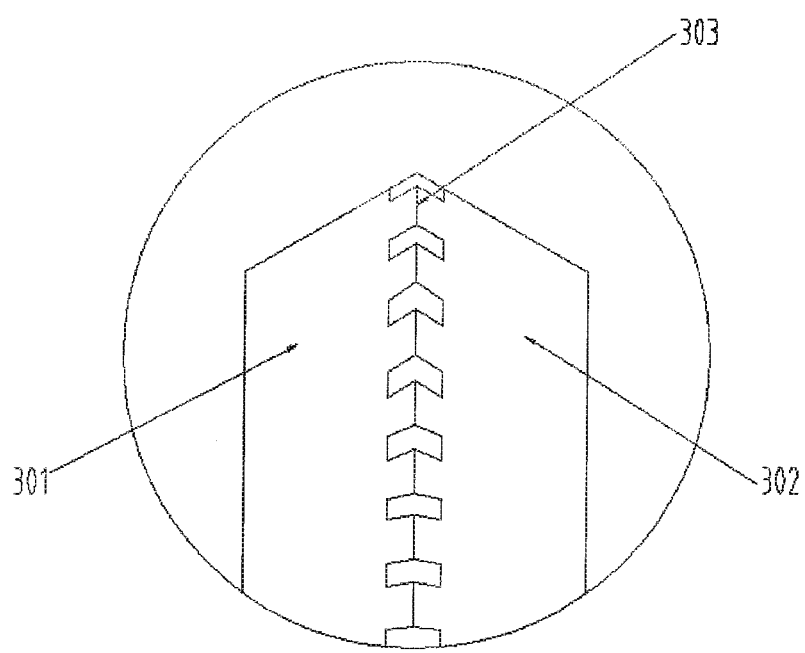
FIG. 3 is a partially enlarged view of the wheel cutter provided by the present invention.

With reference to FIG. 3 that is a partially enlarged view of the wheel cutter provided by the present embodiment, a first disk surface 301 and a second disk surface 302 extend outwardly to form a circumferential cutting edge 303, an angle of a cutting edge of the circumferential cutting edge 303 is an obtuse angle, and a range of angle thereof is 95°-135°.

A main difference of the cutting wheel cutter applied to the present embodiment from a common wheel cutter lies in the openness of the central hollow region and the holes communicating with the hollow region. The wheel cutter is installed on a cutter head of the wheel cutter cutting machine and may be used in the cutting process stage with the covering flexible glass substrate. The unique hollow structure and the openness of the wheel cutter can effectively prevent flexible material scraps generated during the cutting process from remaining among the teeth of the wheel cutter such that cleaning the wheel cutter becomes more convenient to ensure stability of the wheel cutter cutting the flexible glass substrate. At the meantime, the cutting process is more economic and simple when compared to laser cutting processes.

Figure 6:
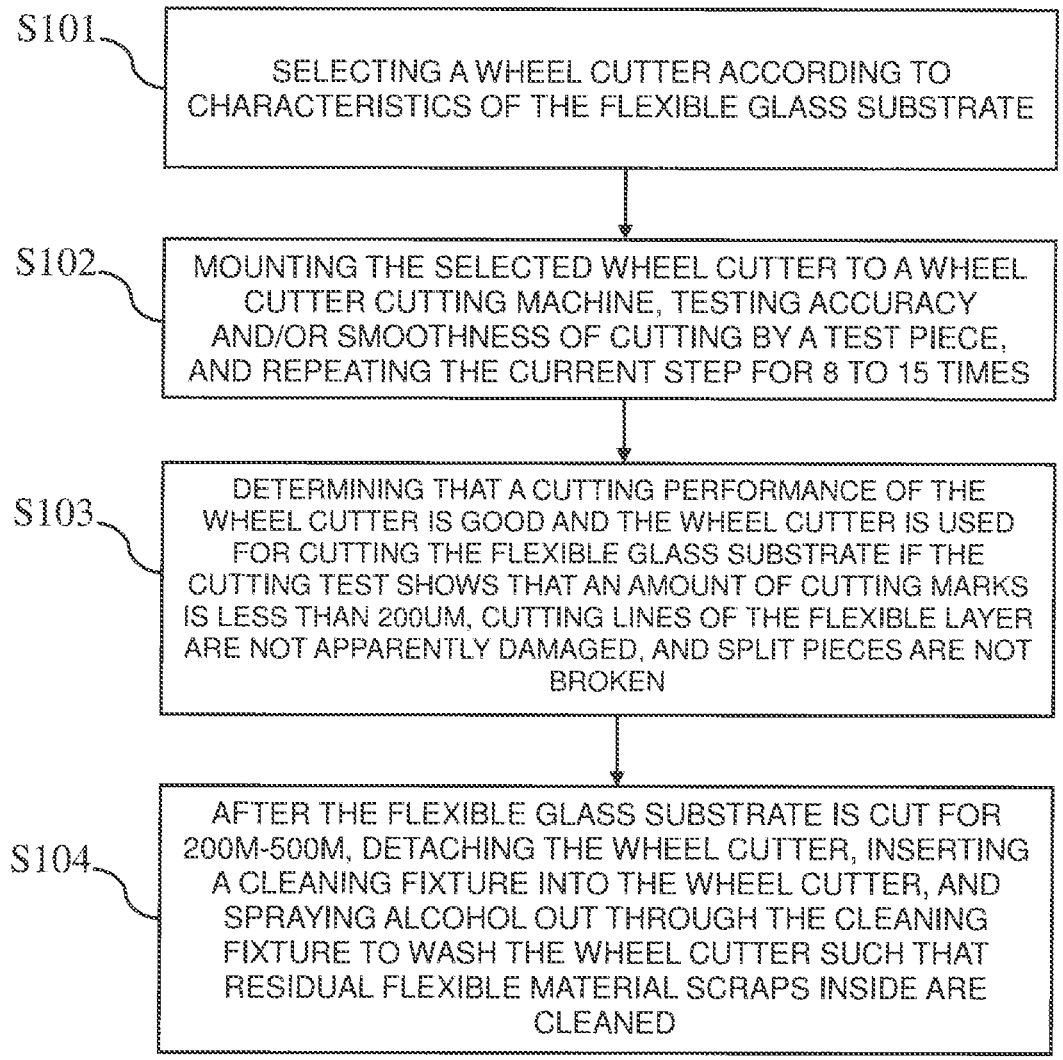
FIG. 6 is a flowchart of the wheel cutter provided by the present invention cutting the flexible glass substrate.

The present invention also provides a flexible glass substrate cutting method using the above wheel cutter, as shown in FIG. 6, the flexible glass substrate cutting method includes steps as follows:

step S101, selecting a wheel cutter according to characteristics of the flexible glass substrate;

step S102, mounting the selected wheel cutter to a wheel cutter cutting machine, testing accuracy and/or smoothness of cutting by a test piece, and repeating the current step for 8 to 15 times;

step S103, determining a cutting performance of the wheel cutter as good and cutting if the cutting test shows that an amount of cutting marks is less than 200 um, cutting lines of the flexible layer are not apparently damaged, and split pieces are not broken; and step S104, after the flexible glass substrate is cut for 200 m-500 m, detaching the wheel cutter, inserting a cleaning fixture into the wheel cutter, and spraying alcohol out through the cleaning fixture to wash the wheel cutter such that residual flexible material scraps inside are cleaned.

Figure 4:
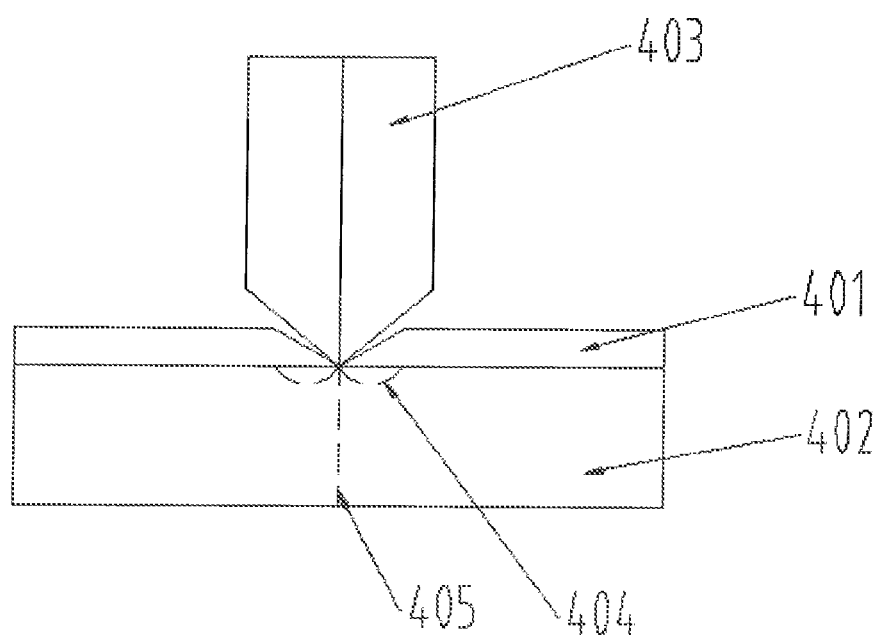
FIG. 4 is a schematic view of the wheel cutter provided by the present invention cutting a flexible glass substrate.

Specifically, after installed in wheel cutter cutting machine, the wheel cutter is utilized to cut the glass substrate covered with the flexible material layer during a flexible Organic light-emitting diode (OLED) device manufacturing process. As shown in FIG. 4, a thickness of the flexible material layer 401 is 10 um-15 um, and a thickness the rigid glass substrate 402 being a lower layer is 0.4 mm-0.5 mm. Generally a cutting pressure is set as 0.15 Mpa-0.2 Mpa, and the wheel cutter 403 cuts and penetrates the flexible material layer 401 under the pressure of the cutting edge thereof. The cutting edge of the wheel cutter 403 presses down to and contacts a surface of the glass substrate 402 being the lower layer. When moving, the wheel cutter 403 leaves a cutting mark on the glass substrate 402. After a series of actions as describe above, the wheel cutter 403 completely cuts the flexible material layer 401 being an upper layer, and forms the cutting mark on the glass substrate 402 being the lower layer. After a pressure opposite to the cutting mark is applied to the glass substrate 402, a splitting action is finished such that cutting process of the flexible glass substrate is accomplished. Because after the wheel cutter 403 cuts the flexible material layer 401, the flexible material layer 401 contracts for 30 um under tension effect, the exposed glass substrate 402 may be abraded and trimmed flatly by a later edge abrading process. The cutting mark includes a horizontal crack 404 and a vertical crack 405.

When the flexible material layer and the glass substrate with larger thicknesses are cut, a wheel cutter with a small angle and a large teeth depth (cutting-edge bevel angle <120°, recess depth ≥10 um) can be selected. Because the wheel cutter of such type has excellent penetrating ability, it can apply superior cutting ability to both the thicker flexible material layer and thicker the glass substrate.

When the wheel cutter performs cutting, open recesses in the surface of the wheel cutter can make the flexible material scraps generated by cutting fall into the internal hollow region and be temporarily stored in the wheel cutter. After cutting is finished, the flexible material scraps may fall off themselves or alternatively after the cutting mileage is accumulated for a certain amount such as 200-500 m, a corresponding cleaning device is applied to blow and clean the internal of the wheel cutter.

Figure 5:
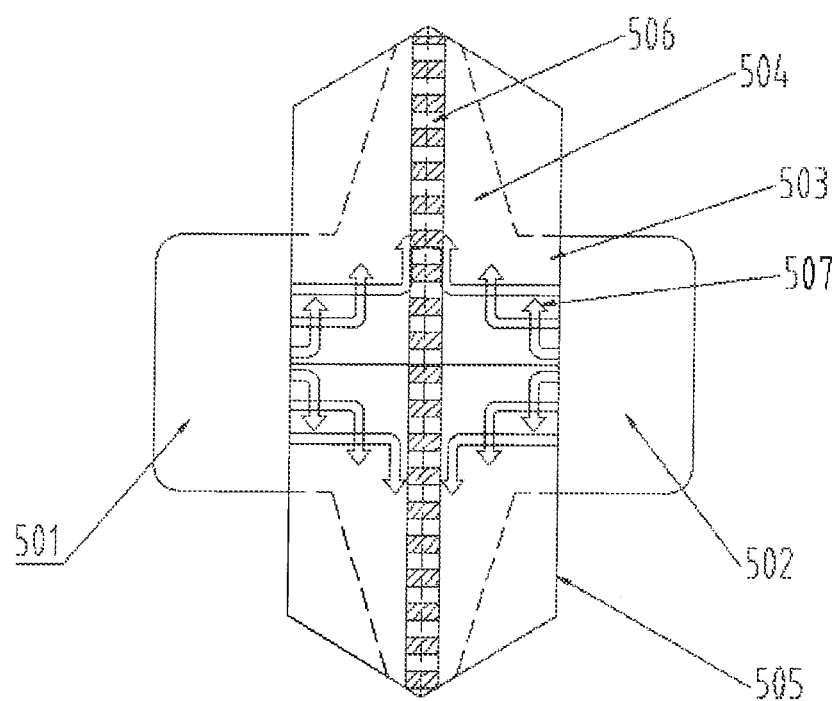
FIG. 5 is a schematic view of a cleaning fixture for the wheel cutter provided by the present invention.

The present invention also provides a cleaning fixture for a cutting wheel cutter of a glass substrate of a flexible display panel, as shown in FIG. 5. The cleaning fixture includes a first cleaning portion 501 and a second cleaning portion 502 disposed opposite to the first cleaning portion 501. The first cleaning portion 501 and the second cleaning portion 502 hold a wheel cutter 505 or extend a central shaft hole 503 of the wheel cutter 505. Each of the first cleaning portion 501 and the second cleaning portion 502 has at least one through hole, and the through hole corresponds to the central shaft hole 503 of the wheel cutter 505. Alcohol or other cleaning liquid or gas is sprayed through two opposite ends of the through hole into a hollow region 504 of the wheel cutter 505 to clean the wheel cutter 505, and residual flexible material scraps in wheel cutter 505 is cleaned out through open recesses 506 along an airflow direction 507. The present invention has no limitation to types and forms of the cleaning fixture.

In comparison to a conventional wheel cutter for cutting a flexible glass substrate, the wheel cutter for cutting a flexible glass substrate provided by the present invention is able to effectively cut flexible glass substrates, and its flexible material scrap temporary storage areas can effectively prevent flexible material scraps from affecting cutting performance of the wheel cutter such that stability of a cutting process in a longer mileage is ensured. By selecting wheel cutters with different cutting-edge bevel angles and teeth depths, cutting requirements for different thicknesses of flexible layers and glass substrates can be satisfied. After the flexible layer is cut by the wheel cutter, because effect of the wheel cutter to the flexible layer in a lateral extent is larger than effect of the wheel cutter to the glass substrate in the lateral extent, the rigid substrate is exposed for 30 um, and therefore excessive abrasion of the flexible layer is prevented in a later edge abrading process. By the designed cleaning device, residual flexible material scraps in the wheel cutter may be effectively removed to ensure stability and yield rate of the process.

Although the preferred embodiments of the present invention have been disclosed as above, the aforementioned preferred embodiments are not used to limit the present invention. The person of ordinary skill in the art may make various of changes and modifications without departing from the spirit and scope of the present invention. Therefore, the scope of protection of the present invention is defined by the scope of the claims.

What is claimed is:

1. A wheel cutter for cutting a flexible glass substrate, comprising:
    a first disk surface;
    a second disk surface disposed opposite to the first disk surface;
    a circumferential cutting edge formed by the first disk surface and the second disk surface extending outwardly and intersecting each other;
    a central shaft hole defined through central portions of the first disk surface and the second disk surface; and
    a hollow region formed by the first disk surface engaged with the second disk surface, the hollow region connected to the central shaft hole and configured to temporarily store flexible polymer scraps, wherein the hollow region is centrally symmetric;
    a plurality of holes distributed on the circumferential cutting edge, communicating with the hollow region, and configured to bring the flexible polymer scraps in the hollow region to store therein;
    wherein the hollow region has a tapered wall defined in each of the central portions of the first disk surface and the second disk surface and is configured to allow insertion of a cleaning device thereinto to clean an inside of the wheel cutter, and the tapered walls in the central portions are arranged symmetrically.

2. The wheel cutter as claimed in claim 1, wherein a length of an opening of each of the holes is within a range of the hollow region.

3. The wheel cutter as claimed in claim 1, wherein each of the holes is a symmetrically V-shaped structure having straight arms, and a bottom opening thereof is arced.

4. The wheel cutter as claimed in claim 1, wherein an outer diameter of the wheel cutter is 1.5 mm-4 mm, a thickness of the wheel cutter is 0.5 mm-1.3 mm, and a diameter of the central shaft hole is 0.7 mm-1.5 mm.

5. The wheel cutter as claimed in claim 1, wherein two opposite sides of the hollow region in the wheel cutter intersect the central shaft hole to form two intersected portions and a width of each intersect portion is 0.3 mm-1 mm.

6. The wheel cutter as claimed in claim 3, wherein a depth of each of the holes is 1 um-15 um, a number of the holes is 10-300, and a radius of the arc of the bottom of each of the holes is 0.2 um-1 um.

7. The wheel cutter as claimed in claim 6, wherein the holes are evenly distributed on the circumferential cutting edge, and a width of the circumferential cutting edge between adjacent two of the holes is larger than or equal to a width of the holes.

8. The wheel cutter as claimed in claim 1, wherein an angle of the circumferential cutting edge is an obtuse angle, and a range of angle thereof is 95°-135°.

9. A wheel cutter for cutting a flexible glass substrate, comprising:
    a first disk surface;
    a second disk surface disposed opposite to the first disk surface;
    a circumferential cutting edge formed by the first disk surface and the second disk surface extending outwardly and intersecting each other;
    a central shaft hole defined through central portions of the first disk surface and the second disk surface; and
    a hollow region formed by the first disk surface engaged with the second disk surface, the hollow region connected to the central shaft hole and configured to temporarily store flexible polymer scraps;
    a plurality of holes distributed on the circumferential cutting edge, communicating with the hollow region, and configured to bring the flexible polymer scraps in the hollow region to store therein;
    wherein the hollow region has a tapered wall defined in each of the central portions of the first disk surface and the second disk surface and is configured to allow an insertion of a cleaning device thereinto to clean an inside of the wheel cutter, and the tapered walls in the central portions are arranged symmetrically.

10. The wheel cutter as claimed in claim 9, wherein a length of an opening of each of the holes is within a range of the hollow region.

11. The wheel cutter as claimed in claim 9, wherein each of the holes is a symmetrically V-shaped structure having straight arms, and a bottom opening thereof is arced.

12. The wheel as claimed in claim 9 cutter, wherein an outer diameter of the wheel cutter is 1.5 mm-4 mm, a thickness of the wheel cutter is 0.5 mm-1.3 mm, and a diameter of the central shaft hole is 0.7 mm-1.5 mm.

13. The wheel cutter as claimed in claim 9, wherein two opposite sides of the hollow region in the wheel cutter intersect the central shaft hole to form two intersected portions and a width of each intersect portion is 0.3 mm-1 mm.

14. The wheel cutter as claimed in claim 11, wherein a depth of each of the holes is 1 um-15 um, a number of the holes is 10-300, and a radius of the arc of the bottom of each of the holes is 0.2 um-1 um.

15. The wheel cutter as claimed in claim 14, wherein the holes are evenly distributed on the circumferential cutting edge, and a width of the circumferential cutting edge between adjacent two of the holes is larger than or equal to a width of the holes.

16. The wheel cutter as claimed in claim 9, wherein an angle of the circumferential cutting edge is an obtuse angle, and a range of angle thereof is 95°-135°.

\* \* \* \* \*